US012783401B2

(12) United States Patent
Montijo et al.

(10) Patent No.: US 12,783,401 B2
(45) Date of Patent: Nov. 3, 2026

(54) METHODS, SYSTEMS, AND COMPUTER READABLE MEDIA FOR USING A DATA BUFFER FOR STORING ACQUISITION DATA

(71) Applicant: Keysight Technologies, Inc., Santa Rosa, CA (US)

(72) Inventors: Allen Montijo, Colorado Springs, CO (US); Daniel James Meulbroek, Colorado Springs, CO (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 122 days.

(21) Appl. No.: 18/539,209

(22) Filed: Dec. 13, 2023

(65) Prior Publication Data

US 2025/0199948 A1 Jun. 19, 2025

(51) Int. Cl.
*G06F 12/02* (2006.01)

(52) U.S. Cl.
CPC .... *G06F 12/023* (2013.01); *G06F 2212/7203* (2013.01)

(58) Field of Classification Search
None
See application file for complete search history.

(56) References Cited

U.S. PATENT DOCUMENTS

| | | | | |
|---|---|---|---|---|
| 9,055,011 | B2 | 6/2015 | Li et al. | |
| 2017/0248633 | A1* | 8/2017 | Montijo | G01R 13/0272 |
| 2017/0248634 | A1* | 8/2017 | Montijo | G01R 13/0272 |
| 2019/0033486 | A1* | 1/2019 | Waslowski | G01V 8/12 |
| 2021/0089454 | A1* | 3/2021 | Simionescu | G06F 13/161 |
| 2022/0068406 | A1* | 3/2022 | Rayaprolu | G11C 16/26 |
| 2022/0303026 | A1* | 9/2022 | Nitsuma | H04B 17/3912 |
| 2023/0297516 | A1 | 9/2023 | Duval | |
| 2023/0358788 | A1* | 11/2023 | Herbordt | G01R 13/0272 |
| 2024/0103043 | A1* | 3/2024 | Ohlen | G01R 13/0218 |

FOREIGN PATENT DOCUMENTS

| | | | | |
|---|---|---|---|---|
| CN | 111290708 | B | 3/2022 | |
| EP | 2293088 | A2 * | 3/2011 | G01R 13/029 |

* cited by examiner

*Primary Examiner* — Hosain T Alam
*Assistant Examiner* — Ryan Dare

(57) ABSTRACT

One example method occurs at a device having a data buffer operating in a segmented memory mode or a qualified store memory mode. The method includes: during an initial phase and prior to an end condition being met, iteratively providing a write pointer indicating one of a first set of memory locations of a first memory segment of the data buffer, wherein iteratively providing the write pointer includes updating the write pointer to a next memory location of the first set of memory locations in a circular manner after acquisition data from a data source is stored in a current memory location; and in response to the end condition being met, changing the write pointer to indicate one of a second set of memory locations of a second memory segment of the data buffer.

20 Claims, 4 Drawing Sheets

300

METHODS, SYSTEMS, AND COMPUTER READABLE MEDIA FOR USING A DATA BUFFER FOR STORING ACQUISITION DATA

TECHNICAL FIELD

The subject matter described herein relates to buffer management. More particularly, the subject matter described herein relates to using a data buffer for storing acquisition data.

BACKGROUND

Buffers and related management can play a pivotal role in various fields, e.g., data processing, communication, and storage. Circular buffers, also known as ring buffers or cyclic buffers, are a type of data buffer that operate in a cyclical manner. For example, a circular buffer may utilize a contiguous memory space (e.g., a fixed-size memory block) and read and write pointers. The read pointer may indicate a location in the memory space for retrieving data, and the write pointer may indicate a location in the memory space for writing or inserting data. As new data is added to the circular buffer, the write pointer may advance along the buffer's memory space in a linear fashion, updating its position to accommodate the newly written data. When the write pointer reaches the end of the buffer's memory space, the write pointer may wrap around to the beginning of the buffer's memory space, creating a circular pattern of data storage.

SUMMARY

Methods, systems, and computer readable media for using a data buffer for storing acquisition data are disclosed. One example method occurs at a device having a data buffer operating in a segmented memory mode or a qualified store memory mode. The method includes: during an initial phase and prior to an end condition being met, iteratively providing a write pointer indicating one of a first set of memory locations of a first memory segment of the data buffer, wherein iteratively providing the write pointer includes updating the write pointer to a next memory location of the first set of memory locations in a circular manner after acquisition data from a data source is stored in a current memory location; and in response to the end condition being met, changing the write pointer to indicate one of a second set of memory locations of a second memory segment of the data buffer.

According to one example system, the system includes a device having a data buffer operating in a segmented memory mode or a qualified store memory mode. The device is configured for: during an initial phase and prior to an end condition being met, iteratively providing a write pointer indicating one of a first set of memory locations of a first memory segment of the data buffer, wherein iteratively providing the write pointer includes updating the write pointer to a next memory location of the first set of memory locations in a circular manner after acquisition data from a data source is stored in a current memory location; and in response to the end condition being met, changing the write pointer to indicate one of a second set of memory locations of a second memory segment of the data buffer.

The subject matter described herein may be implemented in software in combination with hardware and/or firmware. For example, the subject matter described herein may be implemented in software executed by a processor (e.g., a hardware-based or physical processor). In one example implementation, the subject matter described herein may be implemented using a non-transitory computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
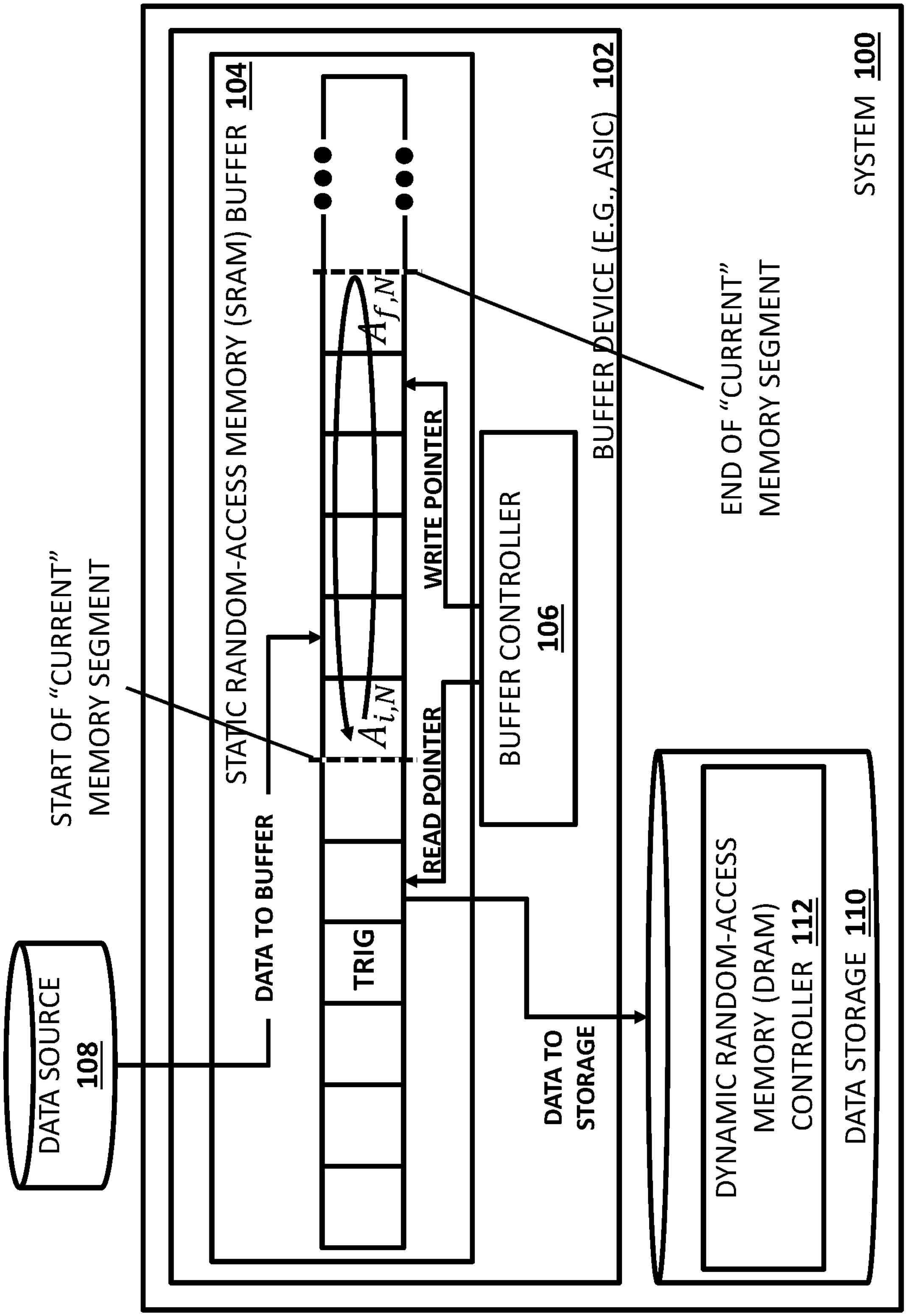
FIG. 1 is a diagram illustrating an example system with a buffer operating in a segmented memory mode.

The subject matter described herein includes methods, systems, and computer readable media for using a data buffer for storing acquisition data. Dynamic random-access memory (DRAM) is widely used due to its speed and capacity to store and access data quickly. For many types of systems, including various computers, DRAM is a common memory for active data storage while the system is powered on. DRAM's architecture, e.g., with its arrangement of capacitors and transistors, allows for fast read and write operations, enabling rapid data access by the CPU.

While DRAM can be a very effective type of memory for a variety of use cases, some applications, such as storage for an oscilloscope measuring radio or electrical signals, may involve storing numerous small, rapidly generated data portions (e.g., discrete data samples, data packets, or observed data points) for analysis. Utilizing DRAM for storing this type of data poses challenges due to DRAM's optimized design for larger data operations. For example, DRAM's unit of access is based on rows and, as such, efficient use of the DRAM read and write bandwidths requires multiple entire rows to be used. Moreover, since DRAM requires entire rows to be read from or written to even for small data portions, inefficiencies and related issues can occur when trying to store rapidly generated (e.g., continuous), small data portion. In particular, DRAM is not well suited for the rapid and continuous influx of small data samples because storing small data samples can lead to frequent row activations, increased refresh cycles, higher power consumption, and greater memory access latency. Thus, while DRAM excels in handling larger data transfers efficiently, its architecture is less optimal for managing streams of small, rapidly generated data, especially when the samples are below a minimum access granularity value associated with the DRAM.

In accordance with some aspects of the subject matter described herein, a static random-access memory (SRAM) or another type of data buffer can be used for temporarily storing rapidly generated data (e.g., samples obtained by an oscilloscope) prior to being stored in a DRAM or DRAM-like data storage, thereby mitigating various issues associated with storing such data samples in DRAM directly. For example, using an SRAM buffer on an application-specific integrated circuit (ASIC) or a chip alongside an off-chip DRAM module can mitigate the issues arising from storing rapidly generated small data samples obtained by an oscilloscope or probe thereof. In this example, the SRAM, known for its faster access speed and ability to read and write smaller portions of data without the need for refreshing cycles, can act as a high-speed intermediate storage. By temporarily holding small data samples in the SRAM buffer until a set of these data samples can be collected and sent to the DRAM module, the SRAM buffer can reduce the frequency of DRAM accesses and mitigate overhead issues caused by frequent row activations and refresh cycles.

In accordance with some aspects of the subject matter described herein, techniques, methods, equipment, systems, and/or mechanisms are disclosed for using a data buffer for storing acquisition data. In some embodiments, a data acquisition system in accordance with aspects described herein may have a device having a data buffer operating in a segmented memory mode or a qualified store memory mode. In such embodiments, the device may be configured for: during an initial phase and prior to an end condition being met, iteratively providing a write pointer indicating one of a first set of memory locations of a first memory segment of the data buffer, wherein iteratively providing the write pointer includes updating the write pointer to a next memory location of the first set of memory locations in a circular manner after acquisition data from a data source is stored in a current memory location; and in response to the end condition being met, changing the write pointer to indicate one of a second set of memory locations of a second memory segment of the data buffer.

Advantageously, a device having a data buffer (e.g., implemented in SRAM or another appropriate memory) operating in an appropriate mode can temporarily store (and potentially overwrite) small data portions (e.g., samples or acquisition data from test equipment (e.g., one or more receivers, spectrum analyzers, network analyzers, etc.), probes, or another data source) until data of interest is captured. After some data of interest (e.g., a batch of data samples related to a trigger or qualified event) is captured, the data can be stored in DRAM or other data storage, e.g., memory that cannot effectively store small data portions directly (e.g., without utilizing a buffer). Moreover, this approach optimizes the utilization of DRAM or similar memory by allowing the data buffer to handle a rapid influx of small data, thereby improving overall system efficiency and reducing latency in handling continuous, fast data generation.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a diagram illustrating an example system 100 with a buffer 104 operating in a segmented memory mode. System 100 may represent or include any suitable entity or entities (e.g., one or more platforms, nodes, or devices) associated with testing, measuring, visualizing, analyzing, and/or recording electrical signals. For example, system 100 may include or represent an oscilloscope, a signal tester, or other device for measuring one or more pulses or electrical signals from a system under test (SUT) or a data source 108, such as an electronic circuit or a related data store. In this example, system 100 may receive an electrical signal via a probe that connects to one or more input channels and then the electrical signal may be used for visualization and analysis.

In some embodiments, system 100 (e.g., an oscilloscope or display thereof) may depict how voltage changes over time, displaying this information on a screen as a graph or a waveform where voltage variations are plotted against time, e.g., with a horizontal axis representing time and a vertical axis representing voltage. In such embodiments, electrical signals may be received via input channels, then the voltage levels may be conditioned and adjusted to fit within their measurement range. In some embodiments, an analog-to-digital converter (ADC) may be used to transform an analog signal into digital data points, allowing for storage, such as in data storage 110 (e.g., an off-chip DRAM module).

In some embodiments, system 100 may provide triggering functionalities that enable users to specify conditions for signal capture initiation, such as voltage thresholds or specific patterns, and can be useful when measuring or analyzing signals that have intermittent or irregular occurrences of interest. For example, when specific conditions are met, like certain parts of an electrical signal appearing or being detected, system 100 may capture just that portion and store it separately, thereby capturing particular moments or events in the signal without needing to save everything.

In some embodiments, a system user may set triggering conditions for visualization or recording data, e.g., the conditions may include threshold values for determining when observed data is of interest or qualified. In this example, user configuration empowers users to analyze various signal characteristics (e.g., voltage levels, frequency, amplitude, and phase), and aids in troubleshooting, circuit analysis, and understanding the behavior of the SUT or data source 108.

System 100 may include a buffer device 102 for temporarily storing data acquired from data source 108. For example, buffer device 102 may include an ASIC or chip associated with acquiring data, e.g., via one or more input channels. Buffer device may include a buffer 104 implemented using one or more memories (e.g., SRAM) and a buffer controller 106 for managing the flow and storage of data in buffer 104, e.g., by coordinating the writing and reading of data to and from buffer 104 using a write pointer and a read pointer.

In some embodiments, buffer 104 may act as an intermediary storage space, allowing system 100 to temporarily store incoming waveform data or samples, e.g., when capturing fast and complex signals from data source 108. In such embodiments, buffer 104 may effectively decouple the acquisition of data from the capture process. For example, assuming a scenario where a primary memory (e.g., data storage 110) utilizes DRAM or a similar memory, buffer 104 (e.g., implemented using SRAM or another memory type) may allow system 100 (e.g., an oscilloscope) to capture bursts of data quickly, by storing it in buffer 104. In this example, the buffered data may then be transferred to the main storage in a manner and speed that aligns with the capabilities of the primary memory. In some embodiments, without buffer 104, system 100 may struggle to keep up with the rapid flow of incoming data, potentially leading to data loss or inaccurate representation of monitored signals.

In some embodiments, buffer controller 106 may be configured to run or operate buffer 104 in one or more modes. For example, buffer controller 106 may control or manage buffer 104 operating in a first-in-first-out (FIFO) mode, a segmented memory mode, and/or a qualified store memory mode. In this example, the different modes in buffer 104 may be handled by manipulating the buffer's read and write pointers, e.g., the write pointer may indicate or point to the memory address of buffer 104 that newly acquired data will be written to and the read pointer may indicate or point to the memory address of buffer 104 that data intended for data storage 110 will be read from.

In some embodiments, memory management metadata may be created and maintained for identifying or delineating boundaries of buffer memory segments and/or other addresses associated with these memory segments. For example, metadata may indicate initial addresses and/or last addresses of circular buffers or other portions of memory segments. This metadata, which may be stored in buffer 104 and/or data storage 110, can facilitate efficient data retrieval and management. For example, if data storage 110 or DRAM controller 112 stores metadata comprising various addresses for buffer memory segments, it can enable streamlined navigation and access of memory resources, facilitating smoother data flow between buffer 104 and data storage 110. In this example, metadata may allow DRAM controller 112 or another entity of system 100 to precisely locate, access, and/or traverse the segmented buffer space, thereby optimizing the overall performance of the memory subsystem.

In some embodiments, information or metadata associated with buffer management can be conveyed to DRAM controller 112 or other entities in system 100 in various ways. For example, indicators (e.g., "marks") in buffer data may convey relevant addresses such that that DRAM controller 112 knows when to record these addresses. In another example, relevant addresses for identifying memory segments or related portions may be calculated or determined by buffer controller 106 and can be stored in buffer 104 or other memory. In this example, DRAM controller and/or other entities of system 100 may be configured to request or access this data.

In some embodiments, system 100 may provide a segmented memory feature that allows system 100 to capture and store specific sections or segments (e.g., packets, RF bursts, etc.) of an input signal, rather than continuously recording the entire waveform, thereby enabling system 100 to selectively capture and store only portions of interest, such as specific events, pulses, anomalies, or triggers within a longer signal. For example, instead of storing a continuous stream of data, segmented memory may divide the acquisition memory into smaller sections, each dedicated to storing a triggered event or a specific segment of the input signal. When a predefined trigger condition or event occurs, the oscilloscope can capture that segment of the signal and saves it into memory. This segmented memory approach can help conserve memory space and allow detailed analysis of specific parts of the signal without being overwhelmed by continuous data.

In some embodiments, system 100 (e.g., a deep memory oscilloscope) may operate in a segmented memory mode and may utilize DRAM in data storage 110 for storing acquisition data. In some embodiments, while operating in a segmented memory mode, system 100 may be configured for capturing data in many small segments, where each segment contains the information from one trigger. As these segments become smaller, they reach a point where there's not enough memory bandwidth available in data storage 110 to store data and handle the DRAM overhead. Over time, this might cause system 100 to come to a halt and lose the user's acquisition data of interest if buffer 104 is not utilized appropriately.

In some embodiments, buffer 104 may be operated in a FIFO mode. For example, when data acquisitions or samples are large enough and do not cause a memory bandwidth issue for data storage 110, buffer controller 106 may operate buffer 104 as a FIFO queue. In some embodiments, when operating buffer 104 in a FIFO mode, buffer controller 106 may increment a write pointer linearly across the full memory address range of buffer 104 until the last address is reached, and then the write pointer may be wrapped back to the first address. After data is added to buffer 104 at the address indicated by the write pointer, a request (e.g., from DRAM controller 112) may be made to a memory arbiter or another entity, and upon that request being granted the data at the address of the read pointer may be sent to data storage 110 or a related memory interface. Then, the read pointer may be incremented to the next memory location of buffer 104. In some embodiments, when buffer 104 is operating in FIFO mode, data in buffer 104 may not be overwritten before being stored in data storage 110 and all acquired data from data source 108 may be written to data storage 110 (e.g., an external or off-chip DRAM module).

In some embodiments, e.g., as depicted in FIG. 1, buffer 104 may be operated in a segmented memory mode. For example, when data acquisitions or samples are smaller than a minimum access granularity value (e.g., 64 bytes) associated with data storage 110 (or a DRAM thereof) or when data acquisition can cause a memory bandwidth issue for data storage 110, buffer controller 106 may operate buffer 104 in a segmented memory mode.

In some embodiments, prior to buffer 104 operating in a segmented memory mode, a user may define a size of the memory segment (Segment_Size) before an acquisition agent starts acquiring data from data source 108. If a user-defined Segment_Size value (e.g., 512 or 256 bytes) is small enough to be stored in buffer 104 for that acquisition agent, then the segmented memory mode for the buffer may be activated. In some embodiments, while buffer 104 is operating in a segmented memory mode, each memory segment may be the same size as a user-defined Segment_Size value, e.g., regardless of the triggering signal portion or data of interest.

In some embodiments, buffer controller 106 may be configured to utilize or operate a segmented memory mode as indicated below. For example, let $A_{i,N}$ be the initial address of a current memory segment N within buffer 104 and let $A_{f,N}$ be the final address of memory segment N within buffer 104. Note that $A_{f,N}=A_{i,N}+\text{Segment\_Size}-1$. While data is being acquired and a trigger event has not been seen by buffer controller 106 or a trigger system (e.g., code, logic, or an entity of system 100 for detecting when a trigger or related conditions occur), a write pointer of buffer 104 may be incremented linearly from $A_{i,N}$ to $A_{f,N}$. If the write pointer increments through $A_{f,N}$ without receiving a trigger, then the write pointer may jump back to $A_{i,N}$ and overwrite the previously stored data. After a trigger event is detected by buffer controller 106 or the trigger system, the write pointer may continue to increment through the address space of the current memory segment in a circular manner until a specified number of post trigger words (e.g., one word may be 32 bits or 64 bits depending on architecture) have been acquired. Then the write pointer may be moved to a new memory segment, e.g., starting at a memory address represented by $A_{f,N}+1$ or $A_{i,N+1}$, for handling a next trigger event. In this example, buffer controller 106 may continue storing data using memory segment N+1 similar to how data was stored using prior memory segment N.

In some embodiments, while buffer 104 is operating in a segmented memory mode and in response to a write pointer jumping to a new memory segment N+1, a read pointer may increment linearly from $A_{i,N}$ to $A_{f,N}$ and then the read pointer may stay at the initial address (e.g., $A_{i,N+1}$) of the memory segment until the memory segment is filled (e.g., until the write pointer is moved to an initial memory address of a next memory segment N+2) and then the read pointer may increment linearly as data is read from this memory segment.

In some embodiments, e.g., while buffer 104 is operating in a segmented memory mode and in lieu of a linear, but circular manner, a read pointer may advance or increment based on acquired time and/or other factors. For example, a read pointer may be adjusted so that buffered data is read in order of time acquired and stored in DRAM in this order. In this example, when the read pointer enters a memory segment N, the read pointer may jump to a memory address comprising the oldest data in memory segment N and then advance in a circular manner. In this example, once the full buffer has been read (the last read portion of memory segment N being the newest data in memory segment N), the read pointer may jump to a new memory segment N+1, where the read pointer stays until memory segment N+1 is filled. Continuing with this example, the read pointer may then be moved to a memory address comprising the oldest data in memory segment N+1 and then advance in a circular manner similar to how data was read in memory segment N.

It will be appreciated that FIG. 1 is for illustrative purposes and that various nodes and/or modules, locations, and/or functionality described above in relation to FIG. 1 may be changed, altered, added, or removed.

Figure 2:
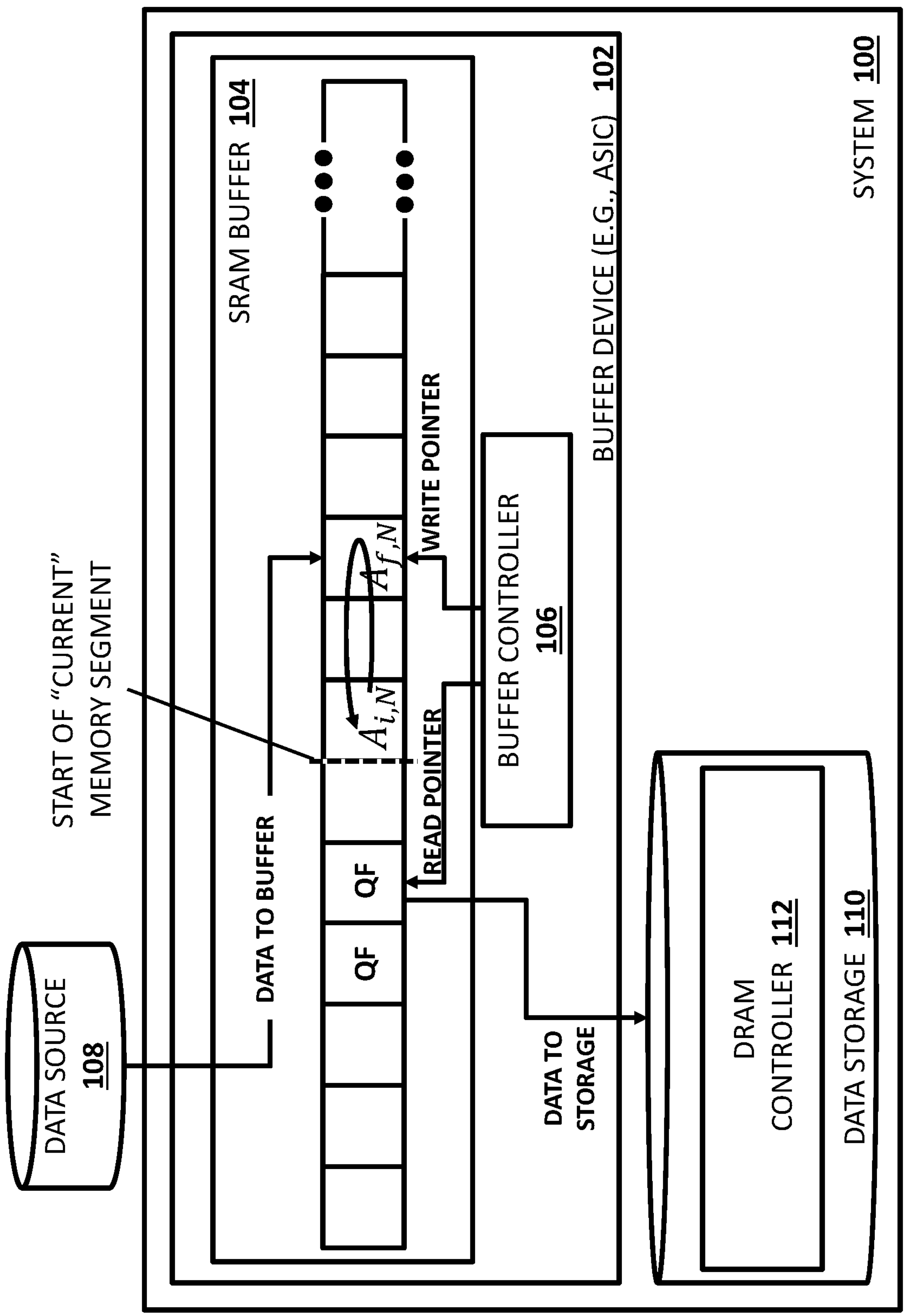
FIG. 2 is a diagram illustrating an example system with a buffer operating in a qualified store memory mode.

FIG. 2 is a diagram illustrating an example system 100 with a buffer 104 operating in a qualified store memory mode. In some embodiments, unless otherwise described, elements depicted in FIG. 2 may include similar functionality or the same functionality as those same-numbered elements depicted in FIG. 1.

In some embodiments, buffer 104 operating in a qualified store memory mode may generate or utilize memory segments of various sizes. For example, each memory segment may be dynamic so as to fit qualified data (e.g., data acquired or received when qualifying conditions are met) that can vary over time. In this example, in contrast to a segmented memory mode where a trigger indicates that data in the memory segment should no longer be overwritten and that acquired data should be written to the memory segment until a predefined or static end of the memory segment is reached, a qualified store memory mode allows the memory segment to grow in size to accommodate or include all the qualified data (and potentially some additional data after the qualifying conditions are no longer met).

In some embodiments, when buffer 104 is operating in a qualified store memory, data acquisition may be controlled using a user-defined qualifier signal, e.g., a set of conditions associated with an electric signal being measured or monitored are detected or met. The acquired data being stored in memory while this qualifier signal is high (e.g., while qualifying conditions are met) may generally be referred to qualified data. In some embodiments, for various purposes, some amount of data (e.g., a predefined or user-configurable amount) may be captured before the qualifier signal asserts and after the qualifier signal de-asserts.

In some embodiments, buffer 104 operating in a qualified store memory mode may store a qualified record comprising qualified data in a memory segment. In some embodiments, a qualified record may include some data acquired before a qualifier signal asserts and/or after the qualifier signal de-asserts (e.g., when the qualifying conditions or characteristics are no longer being met).

In some embodiments, buffer 104 operating in a qualified store memory mode, a user may define a size of a pre-qualifier portion of a memory segment (Pre-Qual_Length) for storing a qualified record before an acquisition agent starts acquiring data from data source 108. If a user-defined Pre-Qual_Length value (e.g., 64 bytes or 128 bytes) is small enough to be stored in buffer 104 for that acquisition agent, then the qualified store mode for the buffer may be activated. In some embodiments, while buffer 104 is operating in a qualified store memory mode, each pre-qualifier portion of every memory segment comprising a qualified record may be the same size as a user-defined Pre-Qual_Length value, while a post-qualifier portion of every memory segment may be dynamic or variable in size for accommodating the qualified data (and some additional data thereafter). For example, in addition to the qualified data, a post-qualifier portion may also store data (e.g., a predetermined or static number of words or bytes) acquired or received after the qualifier signal is de-asserted.

In some embodiments, buffer controller 106 may be configured to utilize or operate a qualified store memory mode as indicated below. In such embodiments, a current memory segment may include a static-sized pre-qualifier portion that acts as a circular buffer where data acquired before the qualifier signal asserts can be overwritten similar to how pre-trigger data is overwritten in a segmented memory as described above and a dynamic-sized, post-qualifier portion that grows linearly to accommodate and store data acquired while the qualifier signal is asserted. For example, let $A_{i,N}$ be the initial address of a pre-qualifier portion of a current memory segment N within buffer 104 and let $A_{f,N}$ be the final address a pre-qualifier portion of memory segment N within buffer 104, e.g., $A_{f,N}=A_{i,N}+\text{Pre-Qual\_Length}-1$. While data is being acquired and a qualifier signal has not been asserted by buffer controller 106 or a trigger or qualifier system (e.g., code, logic, or an entity of system 100 for detecting when qualifying conditions are met or no longer met), a write pointer of buffer 104 may be incremented linearly from $A_{i,N}$ to $A_{f,N}$. If the write pointer increments through $A_{f,N}$ without the qualifier signal being asserted, then the write pointer will jump back to $A_{i,N}$ and overwrite the previously stored data. After a qualifier signal is detected or asserted by buffer controller 106 or the trigger or qualifier system, the write pointer may be moved to $A_{f,N}+1$ (i.e., the start of the post-qualifier portion of memory segment N) and may increment through the buffer's memory space until the qualifier signal is de-asserted and a specified number of words (e.g., bytes or a number of bits) have been acquired after the qualifier signal is de-asserted. Once this occurs, the qualified record may be considered captured and memory segment N may be considered filled. Then, the write pointer may be moved to a new memory segment N+1 for handling a new qualified record, e.g., memory segment N+1 may start at a memory address directly after the last memory address of the post-qualifier portion of memory segment N. In this example, buffer controller 106 may continue storing data using memory segment N+1 similar to how data was stored using prior memory segment N.

In some embodiments, while buffer 104 is operating in a qualified store memory mode and in response to a write pointer jumping to $A_{f,N}$+1 when a qualifier signal is detected or asserted, a read pointer may increment linearly starting at $A_{i,N}$ of memory segment N and continuing until the last memory address of the post-qualifier portion of memory segment N is read. In some embodiments, the read pointer may stay at the initial address (e.g., $A_{i,N+1}$) of the next memory segment N+1 until this memory segment is filled with a qualified record (e.g., via the write pointer) and then the read pointer may increment linearly as data is read from this memory segment.

In some embodiments, e.g., while buffer 104 is operating in a qualified store memory mode and in lieu of a linear, but circular manner, a read pointer may advance or increment based on acquired time and/or other factors. For example, a read pointer may be adjusted so that buffered data is read in order of time acquired and stored in DRAM in this order. In this example, when the read pointer enters a memory segment N, the read pointer may jump to a memory address comprising the oldest data in memory segment N and then advance in a circular manner. In this example, once the full buffer has been read (the last read portion of memory segment N being the newest data in memory segment N), the read pointer may jump to a new memory segment N+1, where the read pointer stays until memory segment N+1 is filled. Continuing with this example, the read pointer may then be moved to a memory address comprising the oldest data in memory segment N+1 and then advance in a circular manner similar to how data was read in memory segment N.

It will be appreciated that FIG. 2 is for illustrative purposes and that various nodes and/or modules, locations, and/or functionality described above in relation to FIG. 2 may be changed, altered, added, or removed.

Figure 3:
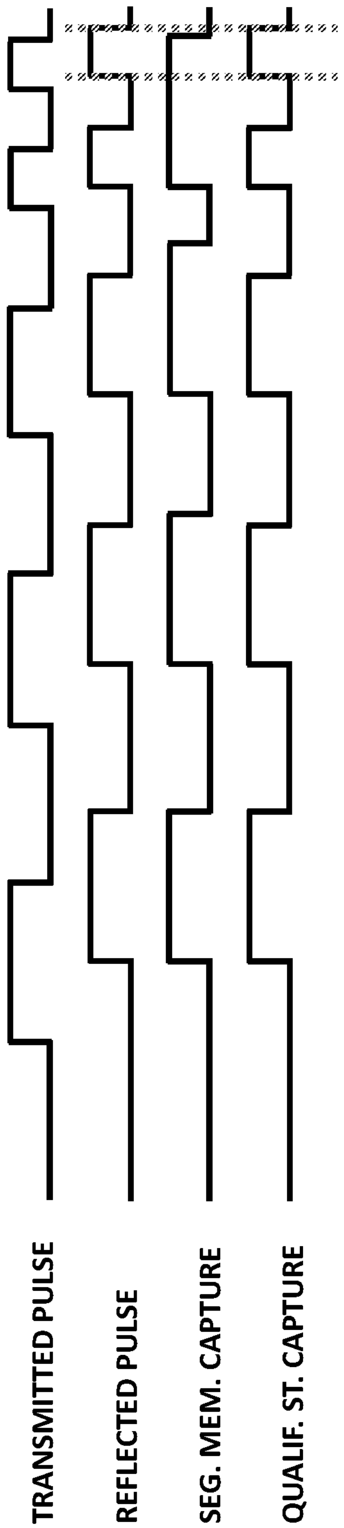
FIG. 3 is a diagram showing example transmitted and reflected pulses and data captures via different modes.

FIG. 3 is a diagram 300 showing example transmitted and reflected pulses and data captures via different modes. In diagram 300, four pulse waves or digital signals are depicted. The top-most pulse wave represents a transmitted pulse observed or measured by system 100. For example, the transmitted pulse may be sent by an RF emitter or a radar emitter for interacting with a circuit or other system. As shown in diagram 300, the transmitted pulse indicates that, over time, the period of the pulse decreases but the frequency increases. The second top-most pulse wave represents a reflected pulse observed or measured by system 100. For example, the reflected pulse may be echo or incident pulse associated with the transmitted pulse interacting with a circuit or other system. As shown in diagram 300, the reflected pulse indicates that, over time, the period of the pulse decreases but the frequency increases. The reflected pulse also indicates that as the frequency increases, the time between when a transmitted pulse is transmitted and the reflected pulse is detected decreases. The third top-most pulse wave represents data observed or captured by system 100 while utilizing a buffer operating in a segmented memory mode. For example, the segmented memory capture wave may show periods of data-capturing as peaks and periods of non-data-capturing as the baseline or resting state. As shown in diagram 300, each capture that occurs in a segmented memory capture mode may be triggered or started when the reflected pulse is detected and may end after a static or predetermined amount of data (e.g., post-trigger words) is acquired. The bottom-most pulse wave represents data observed or captured by system 100 while utilizing a buffer operating in a qualified store memory mode. For example, the qualified store memory capture wave may show periods of data-capturing as peaks and periods of non-data-capturing as the baseline or resting state. As shown in diagram 300, each capture that occurs in a qualified store memory capture mode may be started when the reflected pulse is detected (e.g., when the qualifier signal is asserted) and may end when the reflected pulse is no longer detected (e.g., when the qualifier signal is de-asserted) or soon thereafter.

As shown by the dashed vertical lines, a "high" reflected pulse may be an event of interest and, depending on the mode, may either act as a trigger (e.g., in a segmented memory mode) or as a qualifier signal (e.g., in a qualified store memory mode). As depicted in diagram 300, assuming a "high" reflected pulse is an event of interest that should be recorded, the segmented memory captures may not adequately separate or record events of interest or data thereof, while the qualified store memory captures may be better at adequately separating or recording events of interest or data thereof (with less superfluously or "empty" data captured therewith). As such, qualified store memory captures may be more memory efficient and/or useful when events of interest are unpredictable, sporadic, or dynamic or variable in length (e.g., time).

It will be appreciated that FIG. 3 is for illustrative purposes and that various functionality described above in relation to diagram 300 may be changed, altered, added, or removed.

Figure 4:
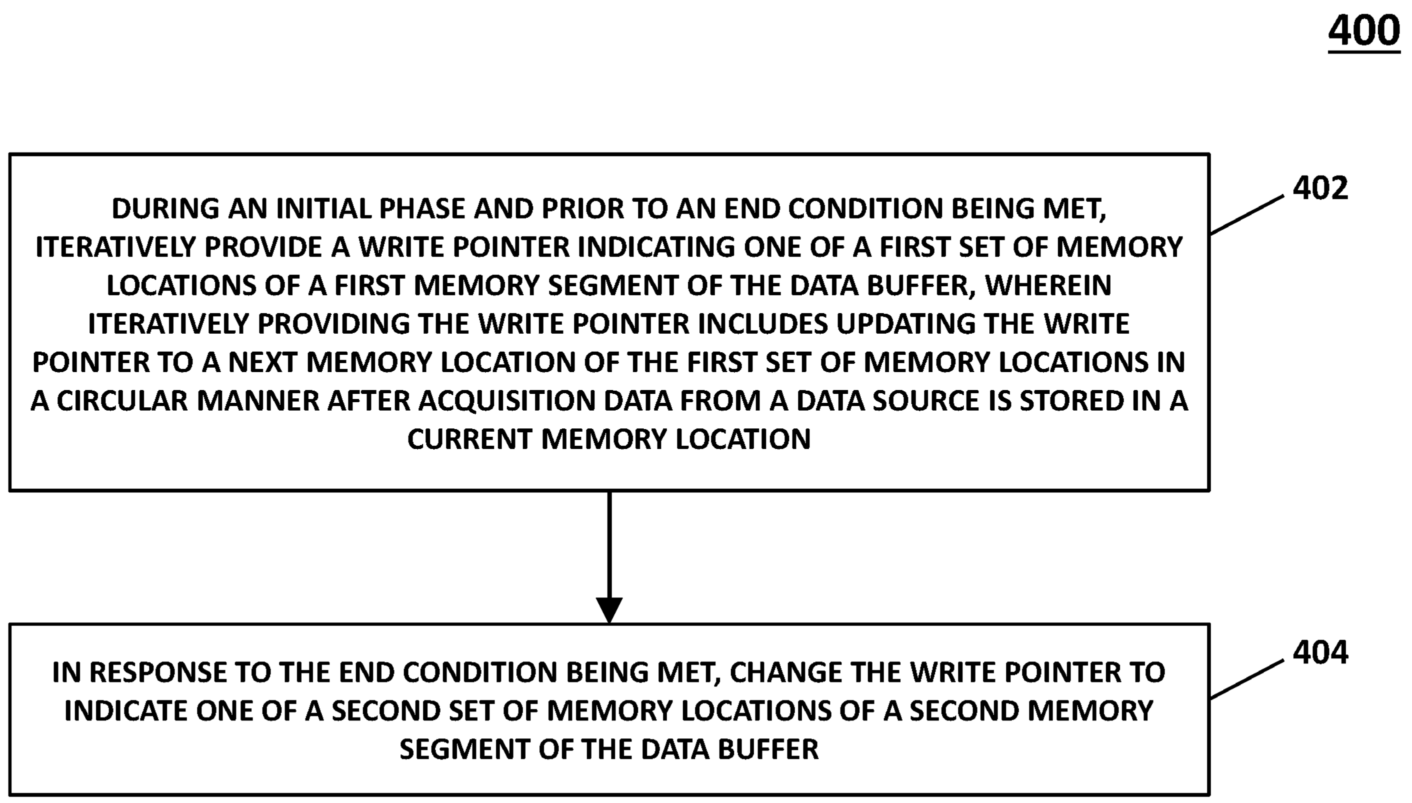
FIG. 4 is a flow chart illustrating an example process for using a data buffer for storing acquisition data.

FIG. 4 is a flow chart illustrating an example process 400 for using a data buffer for storing acquisition data. In some embodiments, process 400 may include steps 402 and 404. In some embodiments, process 400, or portions thereof, may be performed by system 100 (e.g., a data acquisition system, a deep memory oscilloscope, a signal tester, etc.), buffer device 102, buffer controller 106, a deep memory oscilloscope, software or logic executing on a processor, and/or another node or module. For example, process 400 may occur at a device (e.g., system 100, a deep memory oscilloscope, buffer device 102, etc.) having a data buffer (e.g., SRAM buffer 104) capable of operating in various modes, e.g., a FIFO mode, a segmented memory mode, or a qualified store memory mode. In this example, process 400 or operations thereof may be performed by buffer controller 106.

Referring to process 400, in step 402, during an initial phase and prior to an end condition being met, a write pointer indicating one of a first set of memory locations of a first memory segment of the data buffer may be iteratively provided. In some embodiments, iteratively providing a write pointer may include updating the write pointer to a next memory location of the first set of memory locations in a circular manner after acquisition data from a data source is stored in a current memory location.

In some embodiments, each memory location of a first set of memory locations may represent a portion of the first memory segment. For example, assume a memory segment is 64 bytes and includes eight memory locations, where each memory location can store eight bytes of data. In another example, assume a memory segment is 48 bytes and includes six memory locations, where each memory location can store eight bytes of data.

In step 404, in response to the end condition being met, the write pointer may be changed (e.g., moved) to indicate one of a second set of memory locations of a second memory segment of the data buffer. For example, assume a first memory segment spans six contiguous or consecutive memory locations, followed directly by a second memory segment. In this example, when an end condition is met, a write pointer will stop writing data in a circular buffer implemented using the first memory segment and start writing data in a circular buffer implemented using the second memory segment.

In some embodiments, an end condition (e.g., for triggering a new memory segment to write to) may include a qualifier signal being detected or asserted; the qualifier signal being no longer detected or de-asserted; detecting that a trigger is being met or satisfied, detecting that a reflected pulse occurred within a particular amount of time after a transmitted pulse; detecting that the reflected pulse occurred at a particular rate or in a particular pattern; determining that a number of post trigger words have been acquired; or detecting that one or more conditions related to an observable signal have occurred.

In some embodiments, when a data buffer is operating in a segmented memory mode, a first memory segment and a second memory segment may be static in size. For example, each memory segment of buffer 104 may include the same number of memory locations and may be capable of storing the same amount of data (e.g., 64 bytes).

In some embodiments, when a data buffer is operating in the segmented memory mode, process 400 (e.g., performed by buffer controller 106) may further include: in response to or concurrently with changing the write pointer to indicate one of the second set of memory locations, changing a read pointer to indicate a first memory location of the first set of memory addresses; and until the last memory address of the first set of memory addresses is read, iteratively updating the read pointer to a next memory address of the first set of memory addresses after the acquisition data is read from the current memory address indicated by the read pointer.

In some embodiments, when a data buffer is operating in the segmented memory mode, a device (e.g., system 100, buffer device 102, or an entity thereof, such as buffer controller 106) may be further configured for: in response to or concurrently with changing the write pointer to indicate one of the second set of memory locations, changing a read pointer to indicate a first memory location of the first set of memory addresses; and until the last memory address of the first set of memory addresses is read, iteratively updating the read pointer to a next memory address of the first set of memory addresses after the acquisition data is read from the current memory address indicated by the read pointer.

In some embodiments, when a data buffer is operating in a qualified store memory mode, a first memory segment and a second memory segment may be dynamic in size. For example, each memory segment of buffer 104 may include a dynamic number of memory locations based on the amount of data acquired during a predefined scenario (e.g., while a qualifier signal is asserted, such as when qualifying conditions meet or exceed a threshold value). In this example, a first memory segment may be 64 bytes, a second memory segment may be 48 bytes, and a third memory segment may be 80 bytes.

In some embodiments, when a data buffer is operating in a qualified store memory mode, a first memory segment may include the first set of memory locations and a third set of memory locations. In such embodiments, the first set of memory locations may include a static or predefined number of memory locations (e.g., four memory locations). In such embodiments, the third set of memory locations may include a variable or dynamic number of memory locations (e.g., the number of memory locations may be based on the amount of qualified data received).

In some embodiments, a third set of memory locations may be dynamic and based on the amount of data (e.g., samples) received after the qualifier signal is detected and prior to an end condition being met. For example, when buffer 104 is operating in a qualified store memory mode and while a qualifier signal is detected or asserted (e.g., when qualifying conditions meet or exceed a user-configurable threshold value), buffer controller 106 may store qualified data in as many contiguous memory locations as needed (without rewriting or overwriting in a circular manner). In this example, once the qualifier signal is no longer detected or is de-asserted (e.g., when qualifying conditions no longer meet or exceed a user-configurable threshold value), buffer controller 106 may store additional data in one or more contiguous memory locations (e.g., for a certain amount of time or words afterwards) and then change the write pointer to a new memory segment (e.g., starting after the end of the current memory segment).

In some embodiments, when a data buffer is operating in a qualified store memory mode, process 400 (e.g., performed by buffer controller 106) may further include: after the initial phase and prior to the end condition being met: detecting a qualifier signal (e.g., a reflected pulse is detected within a certain amount of time after a transmitted pulse or a particular wavelength or pattern is detected); after detecting the qualifier signal, changing the write pointer to indicate one of a third set of memory locations (e.g., a contiguous number of memory locations); and prior to an end condition being met (e.g., the qualifier signal, iteratively providing the write pointer indicating one of a first set of memory locations of a first memory segment of the data buffer, wherein iteratively providing the write pointer includes updating the write pointer to a next memory location of the third set of memory locations in a linear manner after acquisition data from the data source is stored in a current memory location.

In some embodiments, when a data buffer is operating in a qualified store memory mode, a device (e.g., system 100, buffer device 102, or an entity thereof, such as buffer controller 106) may be further configured for: after the initial phase and prior to the end condition being met: detecting a qualifier signal (e.g., a reflected pulse or particular wavelength or pattern is detected); after detecting the qualifier signal, changing the write pointer to indicate one of a third set of memory locations (e.g., a contiguous number of memory locations); and prior to an end condition being met (e.g., the qualifier signal, iteratively providing the write pointer indicating one of a first set of memory locations of a first memory segment of the data buffer, wherein iteratively providing the write pointer includes updating the write pointer to a next memory location of the third set of memory locations in a linear manner after acquisition data from the data source is stored in a current memory location.

In some embodiments, when a data buffer is operating in a qualified store memory mode, process 400 (e.g., performed by buffer controller 106) may further include: after detecting a qualifier signal, changing a read pointer to indicate a first memory location of a first set of memory addresses; iteratively updating the read pointer to a next memory address of the first set of memory addresses after the acquisition data may be read from the current memory address indicated by the read pointer; after the last memory address of the first set of memory addresses is read, changing the read pointer to indicate a first memory location of the third set of memory addresses; and until the last memory address of the third set of memory addresses is read, iteratively updating the read pointer to a next memory address of the third set of memory addresses after the acquisition data is read from the current memory address indicated by the read pointer.

In some embodiments, when a data buffer is operating in a qualified store memory mode, a device (e.g., system 100, buffer device 102, or an entity thereof, such as buffer controller 106) may be further configured for: after detecting a qualifier signal, changing a read pointer to indicate a first memory location of a first set of memory addresses; iteratively updating the read pointer to a next memory address of the first set of memory addresses after the acquisition data may be read from the current memory address indicated by the read pointer; after the last memory address of the first set of memory addresses is read, changing the read pointer to indicate a first memory location of the third set of memory addresses; and until the last memory address of the third set of memory addresses is read, iteratively updating the read pointer to a next memory address of the third set of memory addresses after the acquisition data is read from the current memory address indicated by the read pointer.

In some embodiments, a first memory segment (e.g., being used for storing acquisition data and/or for implementing a circular buffer) may be equal to or greater than a minimum access granularity value for a dynamic random-access memory (DRAM). For example, data storage 110 may comprise DDR5 or DDR6 and may require or utilize memory access requests that are 64 bytes or larger. In this example, buffer controller 106 may be configured to segment or partition buffer 104 into 64 byte or larger memory segments. Continuing with this example, once a memory segment is filled with relevant samples from data source 108, the memory segment or portions thereof may be made available to data storage 110 or DRAM controller 112 for storage purposes (e.g., via a read pointer) and a new memory segment may be used for buffering subsequently acquired data.

It will be appreciated that process 400 is for illustrative purposes and that different and/or additional actions may be used. It will also be appreciated that various actions described herein may occur in a different order or sequence.

It should be noted that system 100 and/or various modules, nodes, or functionality described herein may constitute a special purpose computing platform, device, or system. Further, system 100 and/or functionality described herein can improve the technological field of data acquisition, deep memory oscilloscopes, or other test and/or measurement equipment. For example, by using buffer 104 or various aspects described herein, an example oscilloscope can effectively and efficiently store rapidly generated small data samples from a probe while mitigating various issues associated with DRAM or similar memory.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for using a data buffer for storing acquisition data, the method comprising:

initially storing acquisition data obtained from an oscilloscope in a data buffer implemented in a static random access memory (SRAM), the data buffer being controllable to operate in a segmented memory mode and a qualified store memory mode;

wherein initially storing the acquisition data in the data buffer in the SRAM includes:

during an initial phase and prior to an end condition being met, iteratively providing a write pointer indicating one of a first set of memory locations of a first memory segment of the data buffer, wherein iteratively providing the write pointer includes updating the write pointer to a next memory location of the first set of memory locations in a circular manner after the acquisition data from the oscilloscope is stored in a current memory location; and in response to the end condition being met, changing the write pointer to indicate one of a second set of memory locations of a second memory segment of the data buffer, wherein initially storing the acquisition data in the data buffer in the SRAM includes operating in the qualified store memory mode in which the acquisition data is from a pulse being monitored and the acquisition data is written to the first memory segment and a size of the first memory segment is allowed to dynamically increase while the pulse being monitored is detected and writing of the acquisition data from the pulse being monitored to the first memory segment ceases and the size of the first memory segment ceases to dynamically increase when the pulse being monitored is no longer detected; and in response to the end condition being met, transferring the acquisition data from the data buffer in the SRAM to a dynamic random access memory (DRAM).

2. The method of claim 1 wherein, when the data buffer is operating in the segmented memory mode, the first memory segment and the second memory segment are static in size.

3. The method of claim 1 wherein, when the data buffer is operating in the segmented memory mode:

in response to or concurrently with changing the write pointer to indicate one of the second set of memory locations, changing a read pointer to indicate a first memory location of the first set of memory addresses; and until a last memory address of the first set of memory addresses is read, iteratively updating the read pointer to a next memory address of the first set of memory addresses after the acquisition data is read from the current memory address indicated by the read pointer.

4. The method of claim 1 wherein, after the writing of the acquisition data from pulse being monitored to the first memory segment ceases, initiating writing of acquisition data from the pulse being monitored to the second memory segment when the pulse being monitored is re-detected and allowing a size of the second memory segment to dynamically increase while the pulse being monitored is detected.

5. The method of claim 1 wherein, when the data buffer is operating in the qualified store memory mode, the first memory segment includes the first set of memory locations and a third set of memory locations, the first set of memory locations include a static number of memory locations.

6. The method of claim 5 wherein the third set of memory locations is dynamic and based on the amount of data received after a qualifier signal is detected or after the qualifier signal is asserted.

7. The method of claim 5 wherein, when the data buffer is operating in the qualified store memory mode, the method further comprising:

after the initial phase and prior to the end condition being met:

detecting a qualifier signal;

after detecting the qualifier signal, changing the write pointer to indicate one of the third set of memory locations; and prior to an end condition being met, iteratively providing the write pointer indicating one of a first set of memory locations of a first memory segment of the data buffer, wherein iteratively providing the write pointer includes updating the write pointer to a next memory location of the third set of memory locations in a linear manner after the acquisition data is stored in a current memory location.

8. The method of claim 7 further comprising:

after detecting the qualifier signal, changing a read pointer to indicate a first memory location of the first set of memory addresses;

iteratively updating the read pointer to a next memory address of the first set of memory addresses after the acquisition data is read from the current memory address indicated by the read pointer;

after a last memory address of the first set of memory addresses is read, changing the read pointer to indicate a first memory location of the third set of memory addresses; and until a last memory address of the third set of memory addresses is read, iteratively updating the read pointer to a next memory address of the third set of memory addresses after the acquisition data is read from the current memory address indicated by the read pointer.

9. The method of claim 1 wherein the first memory segment has a size that is equal to or greater than a minimum access granularity value for the DRAM.

10. A system for using a data buffer for storing acquisition data, the system comprising:

a device comprising:

at least one processor;

a buffer controller; and a static random access memory (SRAM) including a data buffer controllable to operate in a segmented memory mode and a qualified store memory mode, wherein the buffer controller is configured to control the data buffer to initially store acquisition data obtained from an oscilloscope in the data buffer implemented in the SRAM, wherein initially storing the acquisition data in the data buffer in the SRAM includes:

during an initial phase and prior to an end condition being met, iteratively providing a write pointer indicating one of a first set of memory locations of a first memory segment of the data buffer, wherein iteratively providing the write pointer includes updating the write pointer to a next memory location of the first set of memory locations in a circular manner after the acquisition data from the oscilloscope is stored in a current memory location; and in response to the end condition being met, changing the write pointer to indicate one of a second set of memory locations of a second memory segment of the data buffer, wherein the acquisition data is from a pulse being monitored and initially storing the acquisition data in the data buffer in the SRAM includes operating in the qualified store memory mode in which the acquisition data is written to the first memory segment and a size of the first memory segment is allowed to dynamically increase while the pulse being monitored is detected and writing of the acquisition data from the pulse being monitored to the first memory segment ceases and the size of the first memory segment ceases to dynamically increase when the pulse being monitored is no longer detected; and the system further comprises a dynamic random access memory (DRAM) and the buffer controller is configured to, in response to the end condition being met, transfer the acquisition data from the data buffer in the SRAM to the DRAM.

11. The system of claim 10 wherein, when the data buffer is operating in the segmented memory mode, the first memory segment and the second memory segment are static in size.

12. The system of claim 10 wherein, when the data buffer is operating in the segmented memory mode and, the device is further configured for:

in response to or concurrently with changing the write pointer to indicate one of the second set of memory locations, changing a read pointer to indicate a first memory location of the first set of memory addresses; and until a last memory address of the first set of memory addresses is read, iteratively updating the read pointer to a next memory address of the first set of memory addresses after the acquisition data is read from the current memory address indicated by the read pointer.

13. The system of claim 10 wherein, after the writing of the acquisition data from the pulse being monitored to the first memory segment ceases, the device is configured to initiate writing of the acquisition data from the pulse being monitored to the second memory segment when the pulse being monitored is re-detected and allow a size of the second memory segment to dynamically increase while the pulse being monitored is detected.

14. The system of claim 10 wherein, when the data buffer is operating in the qualified store memory mode, the first memory segment includes the first set of memory locations and a third set of memory locations, the first set of memory locations include a static number of memory locations.

15. The system of claim 14 wherein the third set of memory locations is dynamic and based on the amount of data received after a qualifier signal is detected or after the qualifier signal is asserted.

16. The system of claim 14 wherein, while the data buffer is operating in the qualified store memory mode, the device is further configured for:

after the initial phase and prior to the end condition being met:

detecting a qualifier signal;

after detecting the qualifier signal, changing the write pointer to indicate one of the third set of memory locations; and prior to an end condition being met, iteratively providing the write pointer indicating one of a first set of memory locations of a first memory segment of the data buffer, wherein iteratively providing the write pointer includes updating the write pointer to a next memory location of the third set of memory locations in a linear manner after the acquisition data is stored in a current memory location.

17. The system of claim 16 wherein the device is further configured for:

after detecting the qualifier signal, changing a read pointer to indicate a first memory location of the first set of memory addresses;

iteratively updating the read pointer to a next memory address of the first set of memory addresses after the acquisition data is read from the current memory address indicated by the read pointer;

after a last memory address of the first set of memory addresses is read, changing the read pointer to indicate a first memory location of the third set of memory addresses; and until a last memory address of the third set of memory addresses is read, iteratively updating the read pointer to a next memory address of the third set of memory addresses after the acquisition data is read from the current memory address indicated by the read pointer.

18. The system of claim 10 wherein the first memory segment has a size that is equal to or greater than a minimum access granularity value for the DRAM.

19. The system of claim 10 wherein the end condition includes a qualifier signal being detected or asserted; the qualifier signal being no longer detected or de-asserted; detecting that a trigger is being met or satisfied, detecting that a reflected pulse occurred within a particular amount of time after a transmitted pulse; detecting that the reflected pulse occurred at a particular rate or in a particular pattern; determining that a number of post trigger words have been acquired; or detecting that one or more conditions related to an observable signal have occurred.

20. A non-transitory computer readable medium comprising computer executable instructions embodied in the non-transitory computer readable medium that when executed by a device perform steps comprising:

initially storing acquisition data obtained from an oscilloscope in a data buffer implemented in a static random access memory (SRAM), the data buffer being controllable to operate in a segmented memory mode and a qualified store memory mode;

wherein initially storing the acquisition data in the data buffer in the SRAM includes:

during an initial phase and prior to an end condition being met, iteratively providing a write pointer indicating one of a first set of memory locations of a first memory segment of the data buffer, wherein iteratively providing the write pointer includes updating the write pointer to a next memory location of the first set of memory locations in a circular manner after the acquisition data from the oscilloscope is stored in a current memory location; and in response to the end condition being met, changing the write pointer to indicate one of a second set of memory locations of a second memory segment of the data buffer, wherein the acquisition data is from a pulse being monitored and initially storing the acquisition data in the data buffer in the SRAM includes operating in the qualified store memory mode in which the acquisition data is written to the first memory segment and a size of the first memory segment is allowed to dynamically increase while the pulse being monitored is detected and writing of the acquisition data from the pulse being monitored to the first memory segment ceases and the size of the first memory segment ceases to dynamically increase when the pulse being monitored is no longer detected; and in response to the end condition being met, transferring the acquisition data from the data buffer in the SRAM to a dynamic random access memory (DRAM).

* * * * *